(12) United States Patent
Matulich et al.

(10) Patent No.: US 6,324,514 B2
(45) Date of Patent: Nov. 27, 2001

(54) VOICE ACTIVATED SWITCH WITH USER PROMPT

(75) Inventors: Richard Matulich; Allan Ligi, both of Poway, CA (US)

(73) Assignee: VOS Systems, Inc., Poway, CA (US)

( * ) Notice: Subject to any disclaimer, the term of this patent is extended or adjusted under 35 U.S.C. 154(b) by 0 days.

(21) Appl. No.: 09/735,413

(22) Filed: Dec. 12, 2000

Related U.S. Application Data

(63) Continuation of application No. 09/133,724, filed on Aug. 13, 1998, now Pat. No. 6,188,986, which is a continuation-in-part of application No. 09/002,436, filed on Jan. 2, 1998, now abandoned.

(51) Int. Cl.[7] ................................................. G10L 15/00
(52) U.S. Cl. ............................................................. 704/275
(58) Field of Search ..................................... 704/233, 225, 704/270–275; 381/7–110; 375/260

(56) References Cited

U.S. PATENT DOCUMENTS

| H891 | * | 2/1991 | Hashimoto | 704/270 |
|---|---|---|---|---|
| 3,555,192 | * | 1/1971 | Hymer | 381/110 |
| 4,052,568 | * | 10/1977 | Jankowski | 704/233 |
| 4,433,435 | * | 2/1984 | David | 381/110 |
| 5,086,385 | * | 2/1992 | Launey | 704/275 |
| 5,351,272 | * | 9/1994 | Abraham | 375/260 |
| 5,493,618 | * | 2/1996 | Stevens et al. | 381/110 |
| 6,188,986 | * | 2/2001 | Matulich et al. | 704/275 |

OTHER PUBLICATIONS

Sensory, Inc., RSC–164 Data Sheet, pp 1–8, 1996.*
Lereboullet, Voice Recognition Processors (DATABASE), pp 1–12, Nov. 1996.*
Sensory, Inc., Voice Direct™, Speech Recognition IC, pp 1–4, 1996.*

* cited by examiner

Primary Examiner—David D. Knepper
(74) Attorney, Agent, or Firm—Brown Martin Haller & McClain, LLP

(57) ABSTRACT

A voice activated device for producing control signals in response to speech is self-contained and requires no additional software or hardware. The device may be incorporated into a housing that replaces a wall switch that is connected to an AC circuit. An alternate housing is portable and includes a jack that plugs into and lies flush against a standard AC utility outlet, and at least one plug for accepting an AC jack of any electronic product or appliance. The device acts as a control interface between utility power and connected electrical devices by connecting or disconnecting power to the electrical devices based on speech commands.

24 Claims, 11 Drawing Sheets

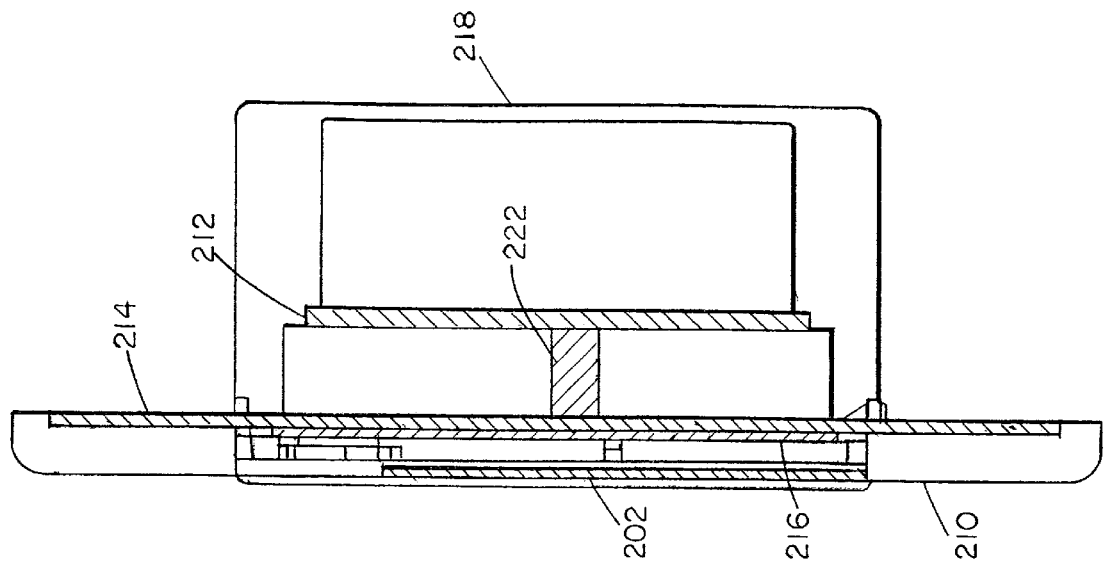
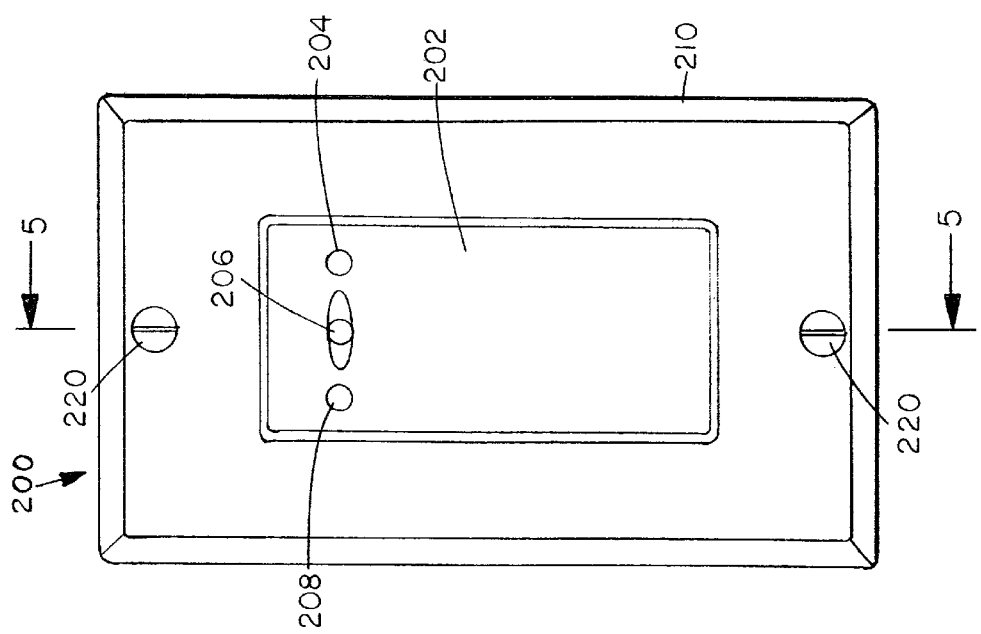
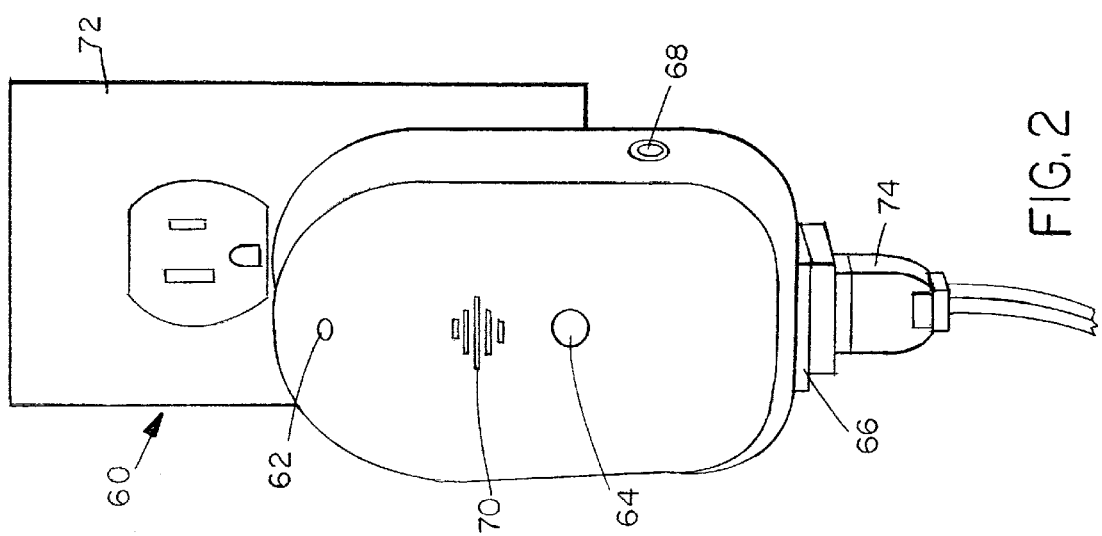

VOICE ACTIVATED SWITCH WITH USER PROMPT

This is a continuation application of application Ser. No. 09/133,724, filed Aug. 13, 1998, now U.S. Pat. No. 6,188,986, which is a continuation-in-part of application Ser. No. 09/002,436, filed Jan. 2, 1998 now abandoned.

FIELD OF THE INVENTION

This invention relates generally to voice activated devices for producing control signals, and more specifically to a voice activated switch for producing control signals to switch on or switch off AC electrical devices.

BACKGROUND OF THE INVENTION

The use of speech recognition technology is becoming a viable means to control one's environment. As the sophistication of speech-activated technology increases and the cost of the associated hardware and software decreases, the use of speech-controlled devices will be commonplace. Applications for speech recognition technology are numerous and include the control of appliances, consumer electronics, toys, and tools. Products and services employing speech recognition are developing rapidly and are continuously applied to new markets.

The use of speech recognition is ideal wherever the hands and/or the eyes are busy. Speech commands are a quick, hands-free way to control electrical devices. The dangers associated with walking into a dark room, or the inconveniences of interrupting tasks in order to turn on appliances or lights, are alleviated by the utilization of speech recognition technology.

Speech recognition technology has been in development for more than 25 years resulting in a variety of hardware and software tools for personal computers. In a typical application, a speech recognition circuit board and compatible software programs are inserted into a computer. These add on programs, which operate continuously in the background of the computer's operating system, are designed to accept spoken words and either execute the spoken command or convert the words into text. The disadvantage in using this approach to control individual appliances is the necessity of one or more computers. Also, it is unlikely that manufacturers will add full blown computer systems to control appliances such as washing machines or electronic products such as stereos. Computer controlled systems that utilize speech recognition have been employed to control the appliances and electronics throughout a house or building, however, these systems are expensive, complicated, and require custom installation.

Remotely controlling an electrical appliance is currently possible using devices employing a variety of technologies. Products using acoustic signals are available on the market to control electrical appliances. These devices recognize specific sounds such as claps, and respond by toggling power switches. One drawback of utilizing an acoustic device is that it does not provide "hands-free" control. Also, the user must remember an acoustic code, such as a sequence of claps, for each appliance.

Another way to control an appliance is by the utilization of a remote control. Remote control units utilizing speech recognition have been designed for electronic products such as VCRs. The speaker talks into a control unit while depressing a switch, and the speech commands are recognized and transmitted to the VCR using infra-red signals. Although this system offers a means for the remote control of electronics, it does not offer a hands-free solution. Additionally, the user must have the remote control unit with him or her, and each target appliance must be adapted to receive IR signals.

Similar to any developing technology, speech recognition poses many hurdles, including designing the most effective user interface, and increasing response accuracy. A non-friendly user interface is likely to frustrate the user when non-responsiveness of the device is the only indication of a recognition error. Another difficulty involves extemporaneous conversations and sounds that may falsely trigger a device response. Speech recognition devices have attempted to overcome this problem by allowing a very limited number of speech commands such as "ON" and "OFF." However, these devices must be programmed with the voices of the speakers that will use the device, and do not anticipate noisy environments in which the device is required to distinguish between the speaker and other noises. Also, the limited vocabulary allows the utilization of one device per room, unless the speaker desires to turn on all appliances at the same time.

The current technology for the remote control of electronic consumer products fails to provide a hands-free, economical, compact, and easy-to-use device. Additionally, available designs do not offer solutions for inaccuracy due to false response, user frustration, and ambient noise interference. These problems and deficiencies are clearly felt in the art and are solved by the present invention in the manner described below.

SUMMARY OF THE INVENTION

It is an advantage of the present invention to provide a compact, stand alone, speech recognition circuit to control a variety of electrical devices, including consumer electronic products or appliances without the need for a host computer.

It is another advantage to provide an easy-to-use device that is programmable to recognize a variety of command words so that more that one device can be utilized within one room.

It is yet another advantage of the present invention to provide a low-cost replacement for a standard wall switch and switch box for speech control of electrical devices connected to the wall switch circuit.

It is still another advantage to provide a portable speech recognition interface between a standard AC outlet and an electrical device.

A further advantage of the invention is to provide a speech recognition device that incorporates user interfaces for confirming acceptance of speech commands thereby increasing recognition accuracy while reducing the necessity for training the user.

In a preferred embodiment of the present invention, a stand-alone, programmable speech recognition device acts as a control interface between a 120 V or 230 V AC switch and a connected electrical appliance or light. In a preferred embodiment ("wall switch embodiment"), the voice activated control circuitry is designed to fit into a switch box shell that can be installed in place of a standard wall switch. In an alternate preferred embodiment ("outlet embodiment"), the voice activated control circuitry is encased in a portable, palm-sized shell that can be plugged into a standard outlet.

In a wall switch embodiment, the speech recognition circuitry of the invention is contained on a circuit board having dimensions to fit within a standard wall switch box. The circuit board has connections for user interfaces including input leads for a microphone for accepting a voice command, a manual switch controller for accepting manual operation of the switch, and at least one light-emitting diode ("LED").

The manual switch controller provides a manual means for operating the switch, and operates in cooperation with the speech recognition circuitry. A variety of technologies can be utilized for the manual switch including rocker switches, actuator-type controls, push-buttons and touch plate technology. The preferred embodiment utilizes capacitance touch plate technology that is known in the art.

The speech recognition device operates in a continuous listening mode which allows it to actively listen for sounds at all times. Ideally, the device is located in a position that is exposed and not hidden behind an object such as a piece of furniture. An exposed location allows a built-in microphone to pick up un-muffled sounds and speech in proximity to the device thereby increasing the response accuracy. The preferred wall switch embodiment is typically placed in a convenient location within a room and positioned at approximately four feet (122 cm) from a floor. Thus, the microphone will be at an optimal level to accept a speaker's commands, particularly in circumstances in which the speaker is seated. Obviously, where an AC outlet or a light is controlled by more than one wall switch, a microphone of at least one of the voice activated wall switches is more likely to be in proximity to the user (speaker).

The outlet embodiment of the present invention is plugged into an AC outlet. The outlet embodiment has at least one plug for accepting the cord jack of an electrical device and may necessarily be plugged into an outlet behind an object that obstructs the line from the user to the device. Therefore, this embodiment may include a separate attachable microphone that is placed in a location most likely to maintain an unobstructed line between the microphone and the user. The use of a separate microphone allows the microphone to be placed in a convenient location that is in close proximity to the user. This is particularly useful where the environment is noisy, or where the user is disabled or has low mobility.

In other embodiments of the outlet and wall switch devices, the microphone circuit includes a receiver for receiving transmitted radio frequency signals from a separate remote microphone. These embodiments are desirable for users who cannot effectively trigger the speech recognition because they are not in proximity to the device. For example, a user who is seated in a position outside the range of the microphone will be unable to control the device. An RF receiver will provide remote speech control of the speech recognition device.

The voice-activated device is continuously listening for an acceptable speech command as long as power from the utility main is available. Thus the device is constantly processing background noises and establishing an ambient noise level. The ambient noise level is an average decibel level of the sounds in the frequency range of speech that are detected by the device. For example, a background noise level of a 50 decibel air conditioning unit causes the device to establish an ambient noise level of 50 decibels. Detected sounds below that level are ignored, and in order for the device to act upon a command word, the user must speak above that decibel level. Establishing an ambient noise level enables the device to be used in noisy environments.

Upon receiving a signal in the frequency range of speech that is louder than the ambient level, the device determines whether the signal is a valid command word. A valid command word is a member of either a set of pre-programmed speaker independent words, or a set of user programmed speaker dependent words. These sets of command words correspond to two modes of operation known in the art as "speaker independent" and "speaker dependent" operation. The user has a choice of the mode of operation upon resetting the device. In the preferred wall switch embodiment of the invention, reset is activated by pressing the touch plate a specified number of times. Reset of the outlet embodiment occurs when the device is initially plugged into an outlet.

The first mode of operation is a speaker independent mode. In this mode the device can be used by various speakers and does not have to be trained to recognize individual voices. Therefore, the device is pre-programmed to respond to a large variety of speech patterns, inflections, and enunciations of the target command word. This mode of operation usually has a lower number of valid command words than a speaker dependent systems that require more memory to store the various speech patterns. In the preferred embodiments, speaker independent command words include a name of an electrical device such as "LIGHTS" followed, by action command words such as "ON" or "OFF" or "DIM."

A speaker dependent mode of operation recognizes only one speaker, or a limited number of speakers at a time. The speaker dependent mode is activated by resetting and "programming" the device. After detecting a reset condition, the device listens for a request to select the speaker dependent mode, and the user follows instructions to program the command words. In a preferred embodiment the user is prompted by the device through use of a user interface which includes prompts from an indicator such as an LED, or speech instructions from the device itself, or both. The device, operating in a speaker dependent mode of operation, achieves a high accuracy of word recognition. The disadvantage to using this mode of operation is that the system response accuracy is limited to the user who programmed the valid command set.

The device limits user frustration by signaling an acceptance of a valid command word through a user interface that includes an indicator such as an LED, or a speaker for communicating speech prompts. The feedback of the user interface permits the user to adjust his or her command word enunciations and inflections which results in a higher response accuracy. Once the device recognizes and indicates acceptance of a valid command word, the user responds with an action command word such as "ON." If the action command word is within the set of valid command words, the device will respond by performing the desired action. For example, in the preferred wall switch embodiment, the device responds to the action command word by connecting power or disconnecting power to an electrical circuit that is connected to the wall switch. For applications where the action command word is meant to dim or brighten lights, the device responds by connecting AC at a reduced or increased voltage. In an alternate mode of operation, the action command word in not used, and the command word such as "LIGHTS" is repeated to toggle the lights on or off.

In a another embodiment of the present invention, the device incorporates current carrier modulation techniques as disclosed in U.S. Pat. No. 3,818,481 of Dorfman, which patent is incorporated herein by this reference. Using this technology, the device recognizes a variety of electrical product command words, where only one command word is valid for the attached product. Other valid command words are transmitted over the utility main to a second device directly connected to the utility main or plugged into an AC outlet. The second device demodulates the command word and makes a determination of whether the command word is contained within its set of valid command words, and whether the command word corresponds to its attached product.

The present invention provides a compact, continuously listening speech recognition circuit that may be incorporated into a variety of designs including wall switches and portable outlet devices. A voice activated wall switch or wall outlet provides an improved method for controlling electrical devices. Limitations of the prior art, including the need for complex computer-controlled systems, user frustration, use in noisy environments, and limited speech command sets, are overcome by the present invention to increase response accuracy and device utility.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to like parts, and in which:

FIG. 2 is a perspective drawing of a portable speech activated device;

FIG. 4 is a front view of a wall switch of a preferred embodiment;

FIG. 5 is a side view of a wall switch of a preferred embodiment;

DETAILED DESCRIPTION OF THE PREFERRED EMBODIMENTS

Figure 1:
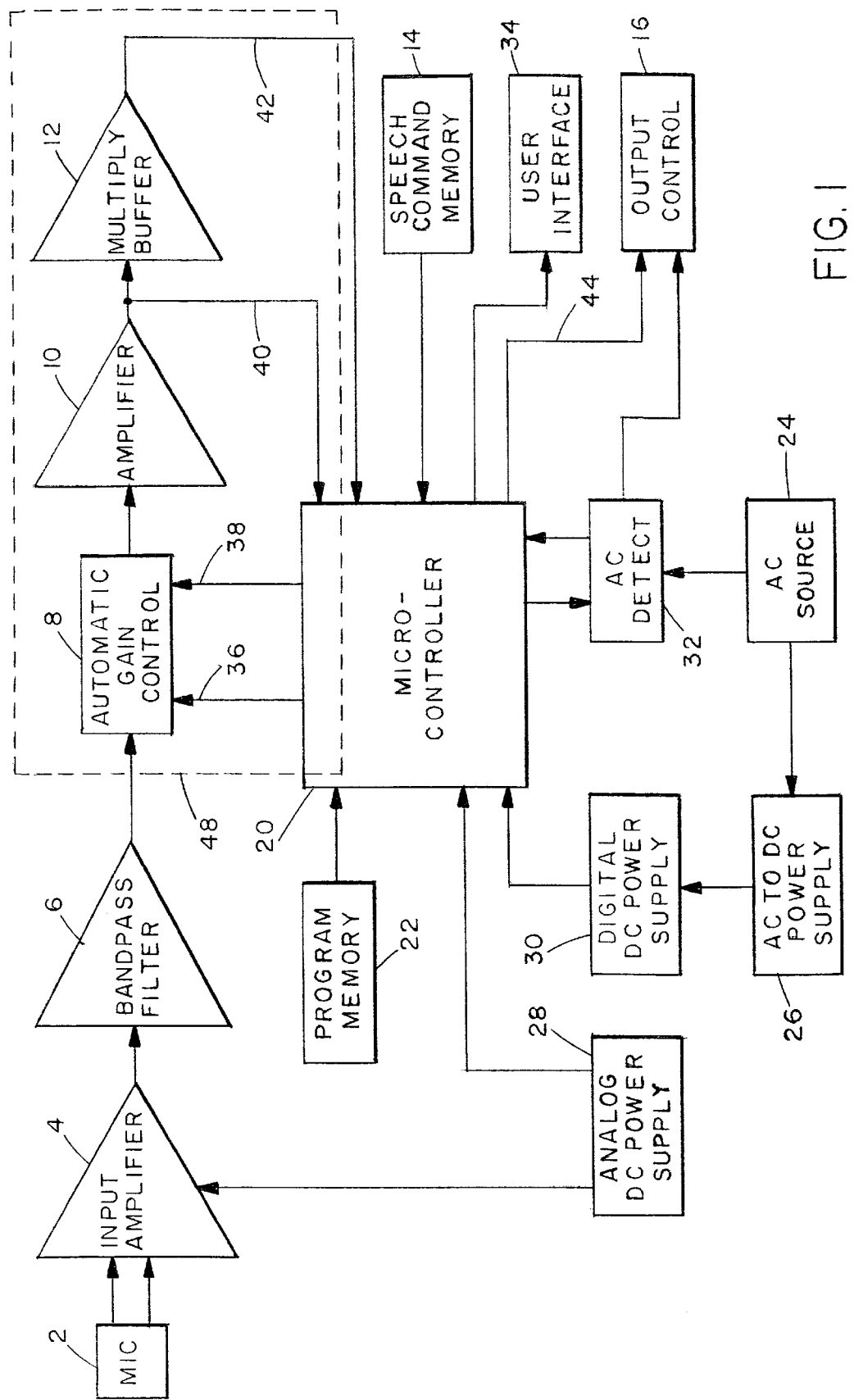
FIG. 1 is a block diagram of a speech controlled device.

"Speech recognition" refers to the ability of a device to recognize what words have been spoken and to take specific actions according to those words recognized. FIG. 1 is a block diagram of a preferred embodiment of the electrical components of a speech recognition device. A microphone 2 accepts and converts speech and other sounds into electrical audio signals. The electrical audio signals at the output of the microphone 1 are amplified by an input amplifier 4 and fed into a bandpass filter 6. The band pass filter 6 of the preferred embodiment is designed to filter signals outside of the frequency range of approximately 580 Hz to 4.2 kHz, which represents the typical frequency range of speech.

The filtered audio signal is introduced into an automatic gain control circuit 8. The phrase "automatic gain control" usually refers to a feedback loop that accepts a varying input signal and uses feedback to maintain a constant output signal. The automatic gain control circuit 8 of the preferred embodiment operates in a different manner by supplying a continuous ambient level signal to the microcontroller 20 over a pre-determined time window. The microcontroller 20 maintains the ambient level during the time window by sending feedback signals 36, 38 to the automatic gain control circuit 8. The ambient level is used as a starting level for recognizing speech. Any background noise received by the device during the time window that is below the ambient level is ignored. After the time window has expired, the device establishes a new ambient level signal.

Establishing an ambient level is desirable feature in noisy environments because the user need only speak above the ambient level to trigger the device. Additionally, the ambient level increases the device accuracy because the device will not falsely trigger in response to a stray or constant background noise. In the preferred embodiment, a time window has a duration in the range of 5 seconds to 1 minute, where approximately 5 seconds is an ideal duration. Obviously, the particular pre-determined time window may vary with the type of environment, and is not meant to be a limiting factor. For example, in a particularly quiet environment, the time window may be of a longer duration because changing background noises are not expected.

In the preferred embodiment, the automatic gain control loop includes the automatic gain control circuitry 8, the microcontroller 20, an amplifier 10, and a multiplying buffer 12. The output of the automatic gain control circuitry 8 is fed into an amplifier 10. The output of the amplifier 10 is fed into the microcontroller 20 and a multiplying buffer 12. Finally, the output of the multiplying buffer is also fed into the microcontroller. Thus, the "ambient level" that is sent to the microcontroller 20 consists of both a zero level 40 at the output of the amplifier 10, and a multiplied level 42 at the output of the multiplying buffer. The microcontroller 20 of the preferred embodiment of FIG. 1 is a general purpose microcontroller manufactured by Sensory, Inc.™ which is configurable for a variety of applications including speech recognition.

The microcontroller of the preferred embodiment requires the zero level 40 and the multiplied level 42 to produce feedback signals 36, 38. However, other embodiments of the invention using different microcontrollers may have differing input requirements to maintain the ambient level that is established using feedback signals 36, 38. Also, the automatic gain control circuitry 48 may be deleted from the circuit of FIG. 1 for embodiments where the microcontroller includes equivalent circuitry of the automatic gain control 8, amplifier 10, and multiply buffer 12. For such embodiments, the output of the band pass filter 6 is directly accepted by the microcontroller 20. As additional functions become available on the microcontroller 20, other circuit functions such as program memory band pass filter and input amplifier may eliminate the need for separate circuits to provide these functions.

The microcontroller circuitry includes the microcontroller 20 and a number of memory modules. The memory modules of the preferred embodiment include the program memory 22 and speech command memory 14 which are shown external to the microcontroller 20, but which may be internal to the microcontrollers of other embodiments of the invention. The program memory 22 is a Read Only Memory (ROM) module which stores the programming code of the microcontroller 20. The programming code establishes the sequence of events that are followed by the device to produce a control signal 44 in response to valid speech commands. The speech command memory 14 of the preferred embodiment employs a Random Access Memory (RAM) module which stores the speaker dependent speech commands. The speaker independent speech commands are stored in a separate memory ROM module (not shown) which may be internal to the microcontroller. The term "memory module" does not necessarily refer to separate circuit elements. For example, all ROM data may be stored in the same circuit element, but at different address block locations.

Power circuitry of the preferred embodiment which supplies analog and digital operating voltages to the device circuitry includes an AC source circuit 24, an AC to DC power supply circuit 26, an analog DC power supply circuit 28, and a digital DC power supply circuit 30. Standard utility AC is supplied to the AC source circuit 24 by means of a standard AC jack that is plugged in to a standard AC outlet 72, as shown in FIG. 2. The device may be adapted to be compatible with a 120 V or 230 V AC standard. The AC to DC power supply circuit 26 convert the standard utility AC to DC voltages which are fed into the analog DC power supply circuit 28 and the digital DC power supply circuit 30. The analog DC power supply circuit 28 supplies power to the input amplifier 4 and the microcontroller 20. The Digital DC power supply supplies digital voltages to the microcontroller 20.

Standard utility AC is also supplied to an AC detect circuit 32 which is connected to the microcontroller 20 and the output control circuit 16. Upon recognition of a valid speech command, the microcontroller sends a control signal 44 to the output control circuit 16. The control signal 44 enables or disables a connection of the standard utility AC into the output control circuit 16. In the preferred embodiment, the output control circuit 16 includes a power switch that connects the standard utility AC to a standard AC plug.

For applications where the device is used as a dimmer, the AC detect circuit 32 synchronizes an AC signal with the standard utility AC to produce an AC waveform having an increased or decreased voltage. The AC waveform is connected to the output control circuit 16 by the control signal 44 upon recognition of a valid speech command.

In a second embodiment of the invention the output control circuit 16 has modulation capability and can modulate and transmit a control signal on the standard utility AC via the AC source circuit 24 using current carrier technology as described herein. This capability allows the device to remotely control electronics and appliances that are connected to the same standard utility AC circuit. The AC detect circuit may also include a demodulator to detect and demodulate a signal from the standard utility AC. The demodulated signal is sent to the microcontroller 20 for a determination of whether the demodulated signal represents a valid speech command for an electrical appliance that is attached to the device. If the signal is a valid speech command, control signal 44 is sent to enable the output control circuit 16.

The user interface circuit 34 of the preferred embodiment is connected to the microcontroller 20 and includes an indicating device such as an LED, or a speaker, or both. The user interface circuit 34, which is provided as a convenience for the user and does not affect the operation of the device, informs the user that the device has received either an invalid or a valid speech command. Without the visual or audio feedback, the user can not be certain of the reason for a non-response of the device. For example, the user may not be enunciating the command correctly, or may be using an invalid speech command. Thus, the user feedback lessens frustration and leads to an increase in correct device responses.

The indicating device includes at least one LED which may be uni- or multi-colored to prompt the user, signal an unrecognized command, and/or signal acceptance of a valid command. The indicating device may also include a display or another means of visually indicating the completion of an event. The speaker is connected to the microcontroller 20 via amplifier circuitry known in the art and provides a means for communicating spoken instructions or audio prompts which are stored in a memory module of the microcontroller 20. Obviously, a combination of an LED and a speaker will provide the highest degree of user convenience.

FIG. 2 is a perspective view of one embodiment of a speech activated device. The device consists of a shell 60 that houses the speech recognition circuitry of FIG. 1, and is designed to be compact and self-contained such that the entire device plugs into a utility outlet 72. The shell contains several openings for components of a speech recognition circuit, and may include openings for an indicating device 64, a speaker 70, a microphone 62, a microphone plug 68, a standard AC utility plug 66, and a standard utility jack (not shown) which plugs into the utility outlet 72. The electronic product or appliance cord 74 is plugged into a standard AC utility plug 66 which is located on a face of the shell 60.

Figure 3A:
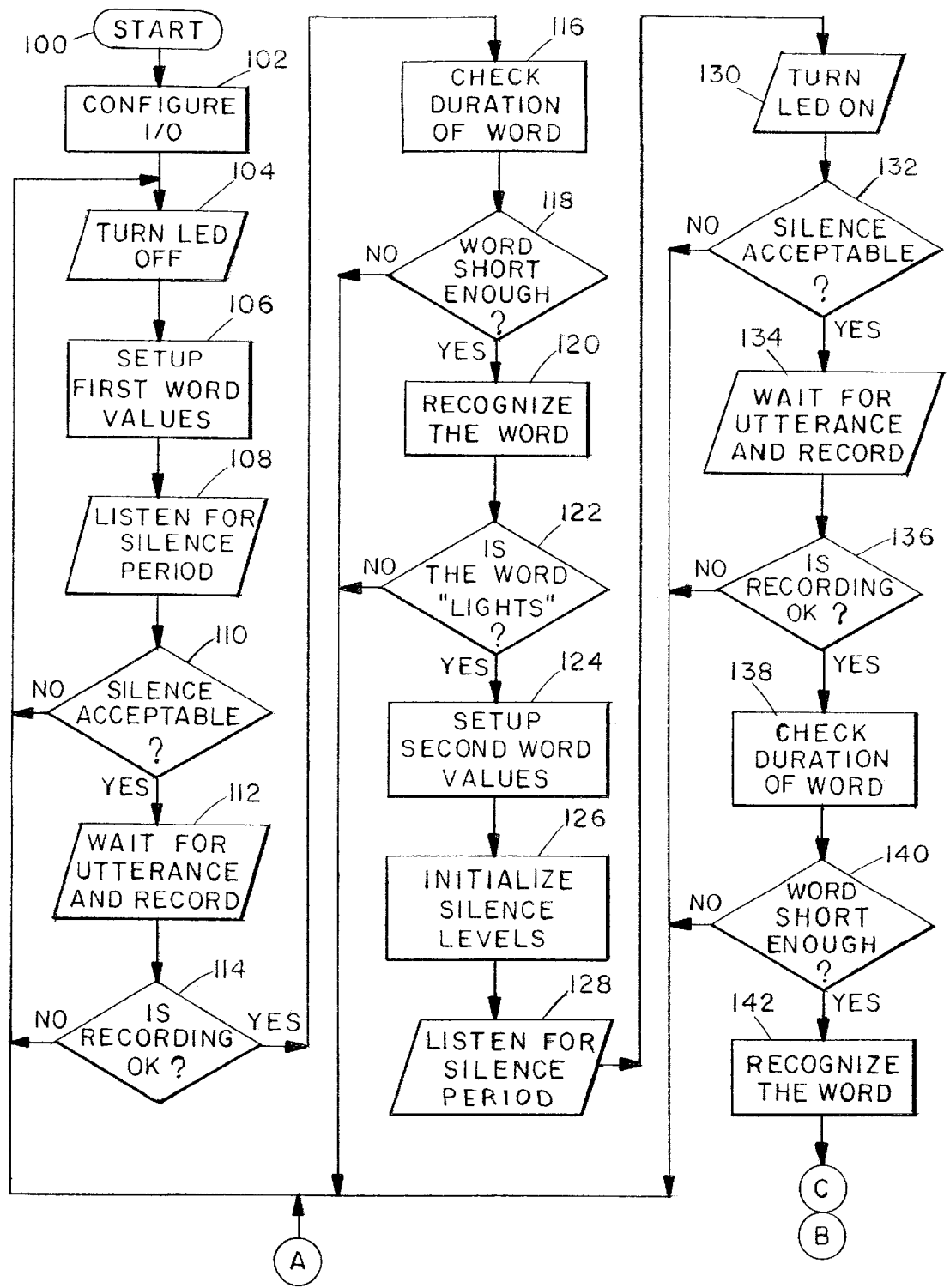
FIG. 3a is a flowchart of a minimal functionality of a programming code for a preferred embodiment of the speech control device.

The program stored in the program memory 22 of FIG. 1 varies to accommodate the available device features and the desired mode of operation. FIG. 3a is a flowchart of functionality of a sample programming code of a preferred embodiment and is not meant to limit the possible programming possibilities. Start block 100 represents the initial power-up of the device after it has been plugged into the utility outlet 72 shown in FIG. 2. The start block 100 may also include additional routines such as a mode of operation routine that prompts the user to record valid speech commands for a speaker dependent application. If user response is not forthcoming, the device defaults to a speaker independent mode of operation. Once the microcontroller 20 has established the operating parameters set forth in the start block 100, the microcontroller 20 proceeds to configure its input/output (I/O) ports. The I/O configuration is predetermined and will vary with the parameters chosen in the start block 100.

The indicating device 64 has a default value, and for the minimal preferred embodiment, the default is an "off" state in which the indicating device 64 is not illuminated. Whether the indicating device 64 is "on" or "off" to indicate an active listening state is a matter of preference, and in an alternate embodiment, the indicating device 64 is illuminated as the default mode to indicate that the device is actively listening.

Block 104, which is the default block for most of the decisions blocks of the subsequent programming code, sets the indicating device into an "off" state. The first expected command word, which may be one of a set of first expected command words, is retrieved in block 106. The device waits for a pre-determined silence period of block 108. If there are no sounds which are within the frequency of speech and above an ambient level for the duration of the silence period, then the silence is acceptable 110 and the device waits for a first speech utterance 112. If the silence is not acceptable, the program defaults to the default block 104 and restarts the above process.

The silence period is a required limitation of the technology, and as the technology improves, the silence period will approach zero. Technology that requires the program to pause in-between words is referred to as discrete speech or isolated speech technology. Discrete speech recognition systems can only recognize words that are spoken separately. In contrast, continuous speech technology does not require phrases of natural speech to be broken into distinct words separated by silences. The device of the preferred embodiment employs discrete speech technology with a silence period on the order of 0.01 to 0.07 seconds. This silence period will vary according to the microcontroller 20 employed.

Block 112 represents the continuously listening feature of the device, and the first utterance does not have to occur within a set time period. Once an utterance occurs the signal, which is received through the microphone 2, is recorded in bock 112. If an acceptable recording has occurred 114, then the duration of the word is checked 116. An acceptable recording 114 is a recording which contains data within the frequency range of speech, and a duration 116 is the actual time that it took to utter the word. Typical durations of words are known because the acceptable command words are from a pre-determined set. Thus, the utterance can be no longer than the longest valid command word. If the utterance is longer than the longest valid command word 118, the program defaults to default block 104, otherwise, the utterance is compared to the words included in the set of valid command words.

The set of valid command words of the minimal preferred embodiment includes the word "LIGHTS." If the recorded utterance of block 112 favorably compares with the pre-recorded samples of the word "LIGHTS" 122, then the device has found a positive match, and proceeds to retrieve the second word values 124 which constitutes a desired action such as "ON" or "OFF" or "LOW." The silence level is initialized in block 126, and has a minimum decibel level equal to the ambient noise level that is determined over a time window. The device listens for an acceptable silence level for a pre-determined time duration 128, and illuminates the indicating device. If the silence period is of an acceptable time duration 132, then the device records the second utterance 134. An acceptable recording 136 and utterance duration 138, 140 advances the program sequence to a point of recognizing the word 142. If the duration of the silence period or the recording is unacceptable, or the duration of the word is too long, then the program defaults to block 104, and the indicating device is turned off and the process starts again.

Figure 3B:
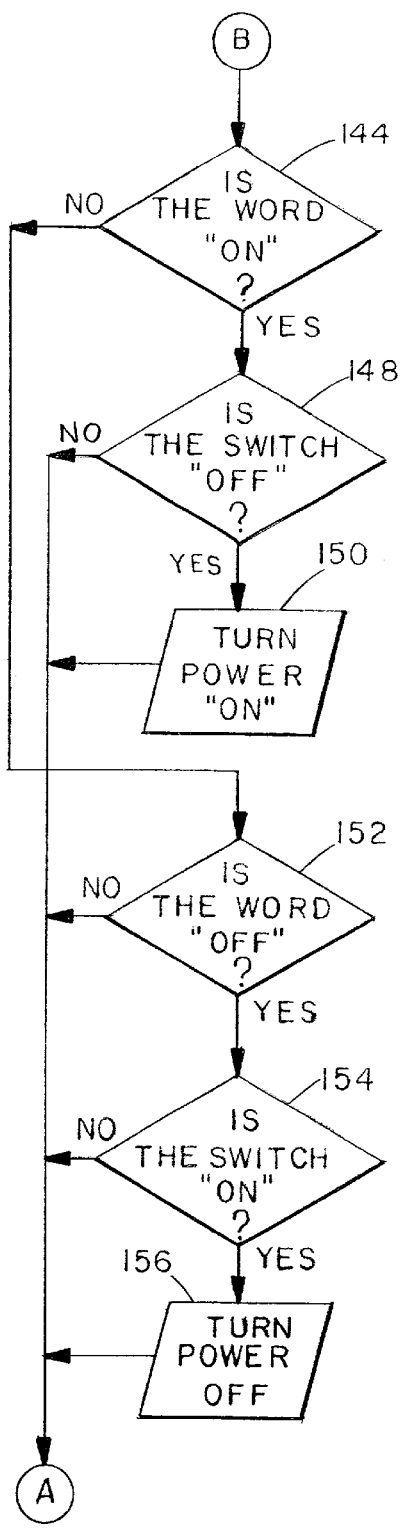
FIG. 3b is a continuation of the flowchart of FIG. 3a for an on/off application.
Figure 3C:
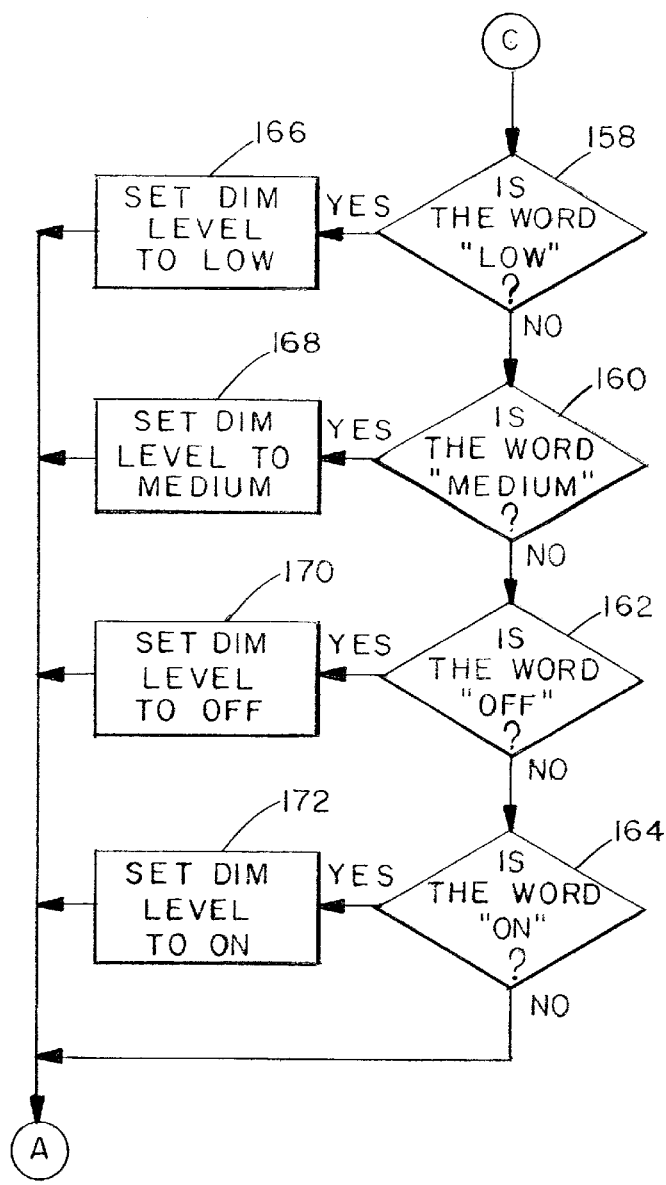
FIG. 3c is a continuation of the flowchart of FIG. 3a for a dimmer application.

FIGS. 3b and 3c are continuations of the program flowchart in FIG. 3a. FIG. 3b represents the program for a simple "ON" or "OFF" application, and FIG. 3c describes the program flow for a light dimmer application. In the application of FIG. 3b, if the second utterance is "ON" 144, and a switch included in the output control circuit 16 is open 148, then a control signal 44 is sent to the output control circuit 16 to close the switch 150. The closed switch connects standard utility AC to a utility plug. The program returns to the default block 104, turns off the indicating device, and waits for a new sequence of speech commands. If the utterance is not "ON" 144, then the utterance is compared to the pre-recorded word "OFF" 152. If the utterance is determined to be a match 152, then a determination is made regarding whether the switch of the output control circuit 16 is closed 154. If the switch is closed 154, a control signal 44 is sent to the output control circuit 16 to open the switch and disconnect AC power from the utility plug 156. All other outcomes return the program to the default block 104.

The continuation of the flowchart for a light dimmer application is illustrated in FIG. 3c. The utterance is compared to pre-recorded words including "LOW" 158, "MEDIUM" 160, "OFF" 162, and "ON" 164. If a match is identified, control signal 44 is sent to the output control circuit 16 to close 166, 168, 172 or open 170 the switch. Also, the microcontroller 20 communicates with the AC detect circuit 32 to send a reduced or increased AC voltage level 166, 168 to the output control circuit 16. A non-matching utterance defaults the program to the default block 104.

FIGS. 1, 2, 3a, 3b, and 3c illustrate a preferred embodiment of a portable, generally palm-sized speech recognition device. The preferred embodiment is plugged into a standard wall socket and includes at least one AC plug for accepting the cord/jack of any AC operated device. The speech recognition device is an economical solution to controlling electrical devices by speech commands.

FIGS. 4 and 5 illustrate another preferred embodiment wherein voice activated control circuitry is housed in a wall switch assembly 200 that includes a switch plate 210 and switch box 218. FIG. 4 illustrates a front view of a wall switch plate 210. The preferred wall switch embodiment utilizes a capacitance touch plate 202 as the manual switching control. Other embodiments may utilize other touch pad technologies or mechanical switches. The switch plate 210 also includes a microphone 206 for accepting speech commands. The user interface of the preferred embodiment utilizes a green LED 208 and a red LED 204 to prompt the user and to indicated that the device is actively listening for a speech command. Other embodiments of the voice activated wall switch may utilize varying user interfaces including one or more LEDs of varying colors, one or more multi-colored LEDs, a character display device, a speaker for audio prompts, or any combination thereof. Standard switch plate screws 220 secure the switch plate 210 to the switch box 218.

FIG. 5 is a cross section of the wall switch assembly 200. The switch box 218 houses a power circuit board 212 and a speech recognition circuit board 216 connected by at least one connector 222. In the preferred embodiment of the voice activated wall switch, the connector 222 includes connections for power signal lines and control signal lines. An aluminum base plate 214 provides structural support for the components of the switch box assembly 200. In addition, the aluminum plate 214 may act as a heat sink for various components on the power circuit board 212 by including wings or tabs that extend from the aluminum plate 214 to contact the power components.

Figure 6:
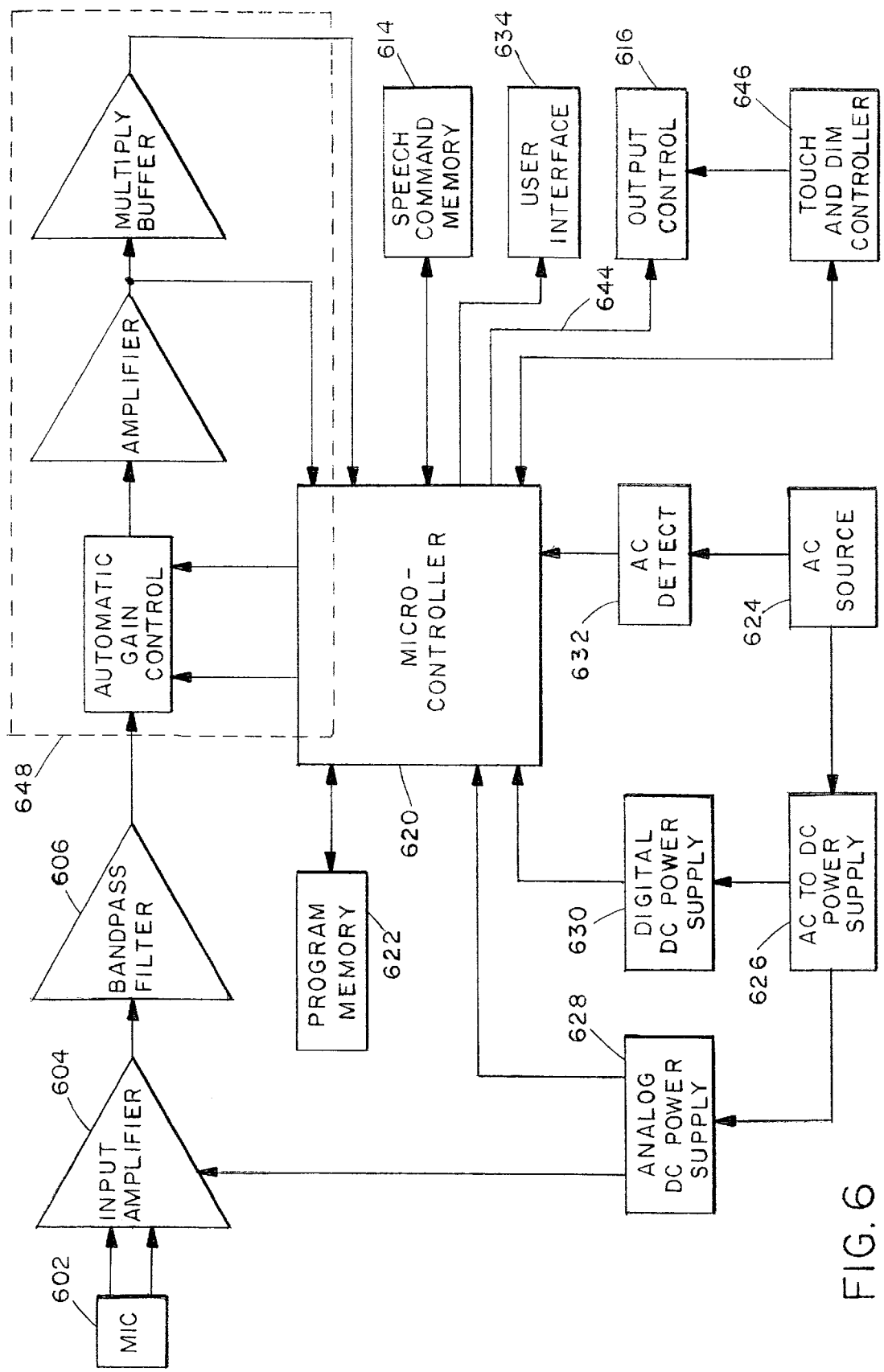
FIG. 6 is a block diagram of a speech activated wall switch.

The speech recognition circuit board 216 is a stand-alone item that may be incorporated into other electrical or electronic devices including various wall switch assemblies. Referring to FIG. 6, the circuit board 216 has inputs that connect to a microphone 602 and AC source 624, and outputs that connect to one or more user interfaces 634, and a touch and dim controller 646 or any other suitable manual switch. Thus, the speech recognition circuit board 216 may be adapted to a particular application by connecting the inputs and outputs to appropriate components.

FIG. 6 is a block diagram of a preferred embodiment of a speech recognition circuit board 216 and externally connected components for a voice activated wall switch assembly 200 as shown in FIGS. 4 and 5. The purpose and operation of the elements of the block diagram of FIG. 6 are substantially similar to the elements of the block diagram of FIG. 1. The microphone 602 connects to an input to the speech recognition circuit board 216 and converts speech and other sounds to electrical audio signals. The electrical audio signals are amplified by an input amplifier 604 and filtered by a band pass filter 606 to exclude frequencies outside the frequency range of speech.

An automatic gain control circuit 648 accepts the filtered audio signal from the band pass filter 606 and establishes an ambient noise input level for microcontroller 620. In other embodiments, the automatic gain control circuit 648 may be included in the microcontroller 620 allowing the output signal from the band pass filter 606 to be directly connected to the microcontroller 620.

The power circuitry of the preferred embodiment resides on the power circuit board 212 as shown in FIG. 5. The power circuitry includes an AC source input circuit 624, an AC to DC power supply circuit 626, an analog DC power supply circuit 628, a digital DC power supply circuit 630, and an AC detect circuit 632. The AC source input circuit 624 is directly connected to an AC circuit provided to the wall switch. In other embodiments, portions of the power circuitry may reside on the speech recognition circuit board 216.

The microcontroller circuitry includes the microcontroller 620, program memory 622, and speech command memory 614 which are shown external to the microcontroller 20, but which may be internal to microcontrollers of other embodiments of the invention. The program memory 622 is a Read Only Memory (ROM) for storing programming code of the microcontroller 620. The program memory 622 or an additional ROM stores speaker independent words. The speech command memory 614 of the preferred embodiment stores speaker dependent speech commands that are programmed by a user into the device during a programming mode.

The user interface 634 of the preferred embodiment of the voice activated wall switch assembly 200 includes a green LED 208 and a red LED 204 as illustrated in FIG. 4. Other embodiments may include a single LED, or any other type of indicator that is controllable by the microcontroller 620. The user interface 634 provides visual prompts for the user to indicate that the circuit is operating and accepting speech commands or programming mode inputs of speaker dependent commands.

Output control signal 644 is generated by the microcontroller 620 for instructing the output control circuitry 616 to switch power on or off, to toggle power, or to reduce power, i.e. dim lights. The output control circuitry 616 of the preferred embodiment is located on the power circuit board 212, and is connected to the speech recognition circuit board 216 via the connector 222. It should be noted that the division of circuitry between the speech recognition circuit board 216 and the power circuit board 212 is a matter of design convenience, only. Other embodiments of the voice activated wall switch may vary the locations of the electrical components.

The voice activated wall switch has a manual touch and dim controller 646 that includes the touch pad 202 of FIGS. 4 and 5 for manually controlling a switch located in the output control circuitry 616. The speech control and the touch control are simultaneously active. In addition, the current state of the power is known by the microcontroller 620. For example, if an electrical device, e.g. a light, is "ON," then pressing the touch pad 202 will toggle the power "OFF." If a user subsequently uses a speech command "LIGHTS," the power is switched "ON."

Figure 7A:
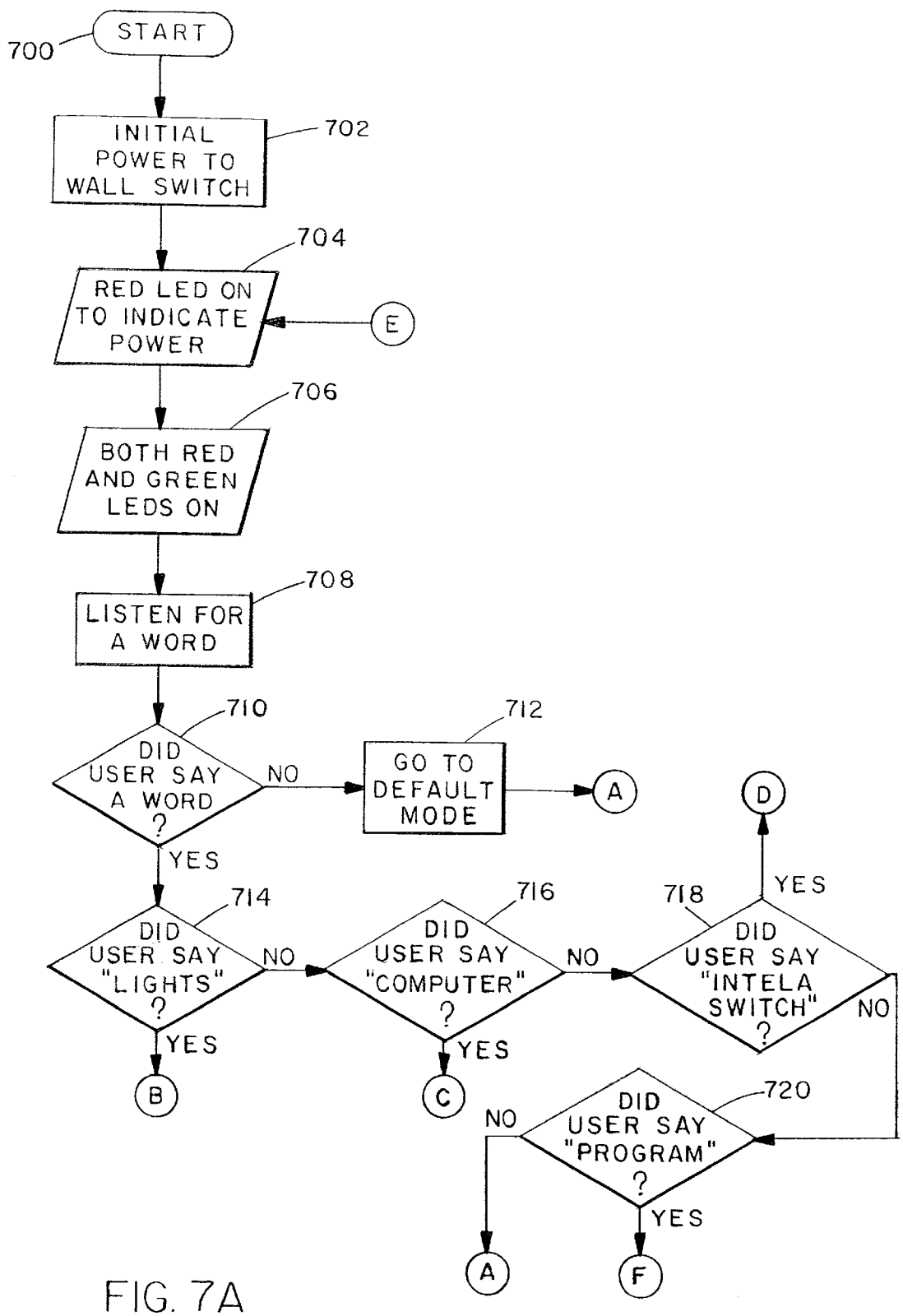
FIG. 7a is a flowchart of a wall switch of a preferred embodiment.

FIGS. 7a through 7h illustrate a flow diagram for the microcontroller program ("the program") of a preferred embodiment of the voice activated wall switch. Referring to FIG. 7a, start blocks 700 and 702 represent an initial application of AC power to the wall switch circuitry that occurs during installation of the device. A red LED 204, as shown in FIG. 4, is illuminated 704 to indicate that the device has power. The green LED 208 is also illuminated 706 to indicate that the device is listening for a word 708. If the user does not issue a speech command 710, then the program branches to a default mode 712. If the user utters a user independent command as shown in decision blocks 714, 716, 718, then the program branches to the appropriate mode of operation. The command "PROGRAM" 720, causes the microcontroller 620 to initiate a programming mode to learn user dependent commands. An unrecognizable command, i.e. a command that is not in microcontroller memory, causes the program to branch to default mode 722 shown in FIG. 7b.

Figures 7B, 7C:
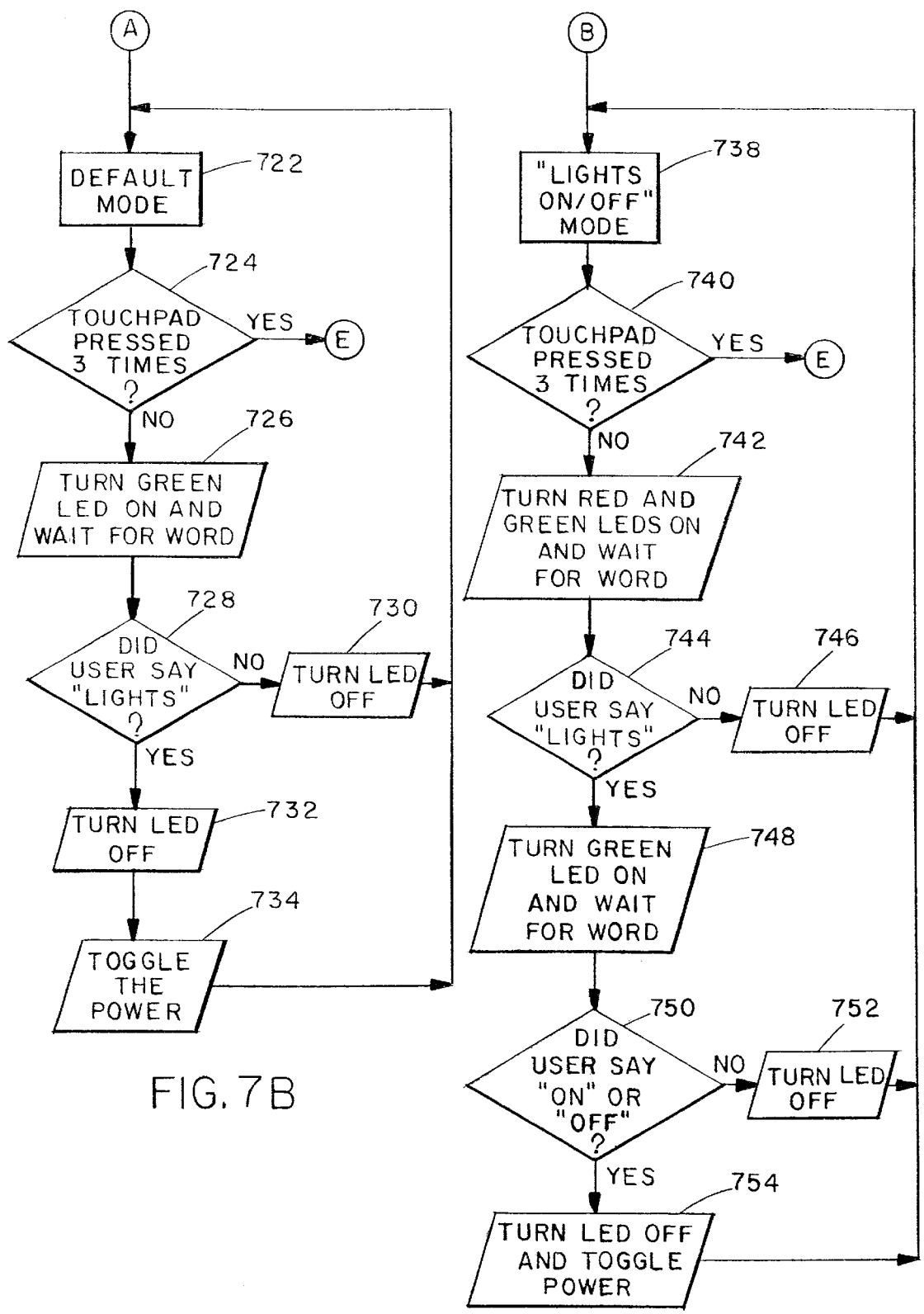
FIG. 7b is a continuation of the flowchart of FIG. 7a for a default mode of a preferred embodiment.
FIG. 7c is a continuation of the flowchart of FIG. 7a for a first user independent mode.

FIG. 7b illustrates a Default Mode 722 of the wall switch of the preferred embodiment. The microcontroller 620 determines whether the user has pressed the touch pad three times 724 for the purpose of resetting the mode of operation. Other embodiments of the program may use a different mode reset requirement, e.g. two quick presses to the touch pad rather than three. As described herein, a single press to the touch pad toggles the state of the applied AC power to "on" or "off." In the preferred embodiment of the voice activated wall switch, three presses to the touch pad cause the program to branch to the start of the mode selection sequence, block 704 of FIG. 7a. If a reset condition is not detected, the green LED 208 is illuminated 726, and the voice activated device waits for a command word. If the user says the command "LIGHTS" 728, the green LED 208 is turned off and the microcontroller 620 sends a control signal 644, as shown in FIG. 6, to the output control circuit 616, to toggle the power 734. Upon toggling the power in block 734, the program loops back to the start of default mode 722.

A Lights On/Off Mode is illustrated in FIG. 7c. The program checks for a reset condition 740. If the user has not initiated a reset, the green LED 208 and the red LED 204 illuminate 742 to indicate that the voice activated device expects to receive an acceptable first word. Any detected word other that "LIGHTS" 744, causes the program to branch to the start of the Lights On/Off Mode 738. If the word "LIGHTS" is detected 744, the green LED 208 is illuminated 748 to indicate that the device expects to receive a second acceptable word, "ON" or "OFF" 750. If the device does not detect either acceptable word 750, the program branches to the start of the Lights On/Off Mode 738. If the device detects either the word "ON" or "OFF" 750, the green LED 208 is turned off and the power is toggled accordingly 754.

Figures 7D, 7E:
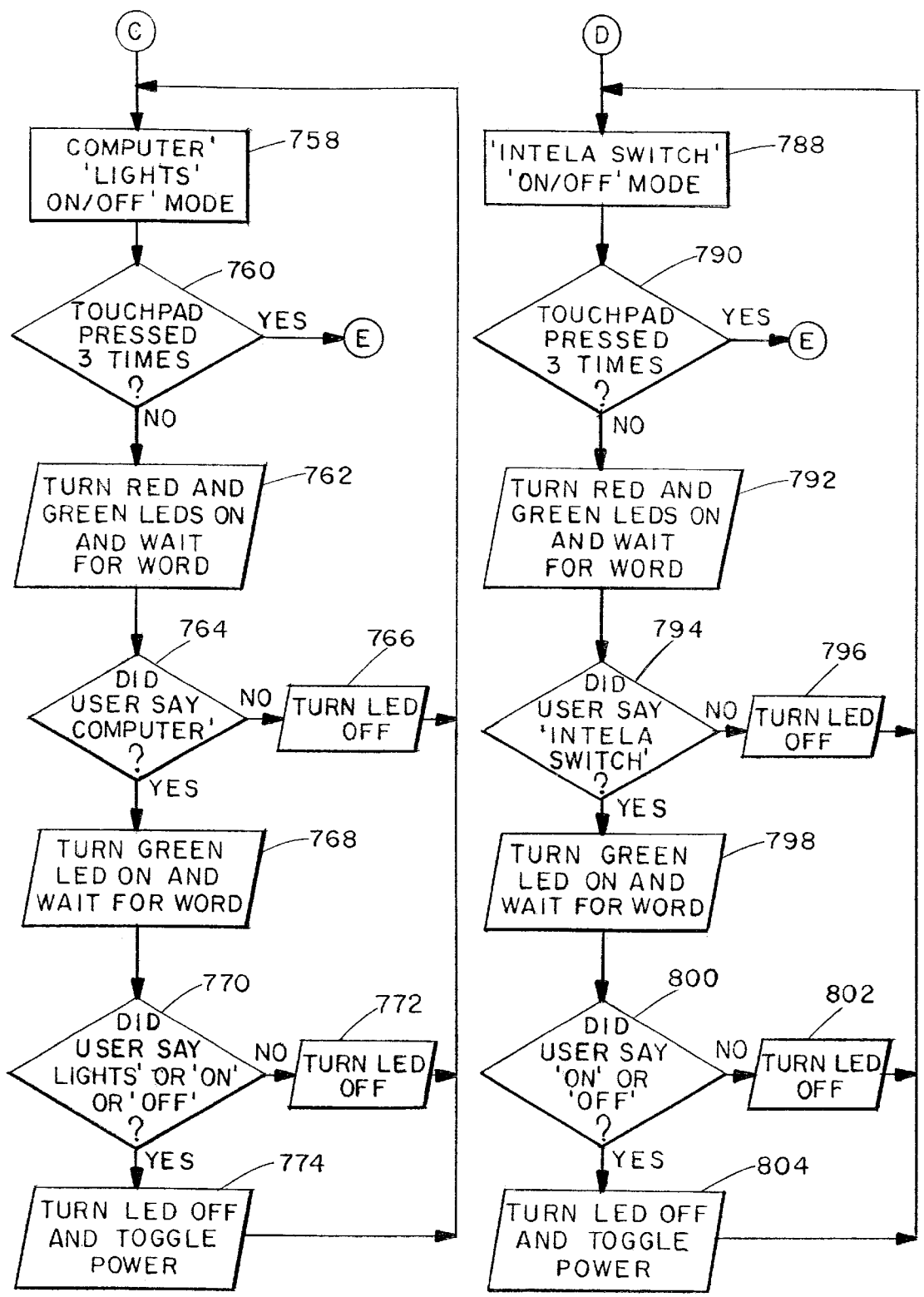
FIG. 7d is a continuation of the flowchart of FIG. 7a for a second user independent mode.
FIG. 7e is a continuation of the flowchart of FIG. 7a for a third user independent mode.

FIG. 7d illustrates the user independent Computer Lights On/Off Mode 758. Absent a reset condition 760, the device illuminates both LEDs 204, 208, and waits for an acceptable first word 762. If the word "COMPUTER" is detected 764, the green LED 208 is illuminated 768 to indicate that the device is waiting for a second word, "LIGHTS," "ON," or "OFF" 770. Upon detection of an acceptable word, the green LED 208 is turned off and the power is toggled accordingly 774.

FIG. 7e also illustrates a user independent mode in blocks 788 through 804. If the user does not reset the mode 790, the LEDs illuminate 792. The first expected word is "INTELSWITCH" 794 and the second expected word is either "ON" or "OFF" 800. If the words are not detected in the appropriate order, the program turns off the illuminated LEDs 796, 802 and branches to the start of the mode 788. An acceptable sequence of commands causes the microcontroller 620 to send a control signal 644 to switch the power either "ON" or "OFF" 804.

The program flowchart of the preferred embodiment of a voice activated wall switch illustrates a default mode and three additional user independent modes. The words used as command words for these illustrative modes are not meant to be limiting, and other words and sequences of words may be programmed into program memory.

Figure 7F:
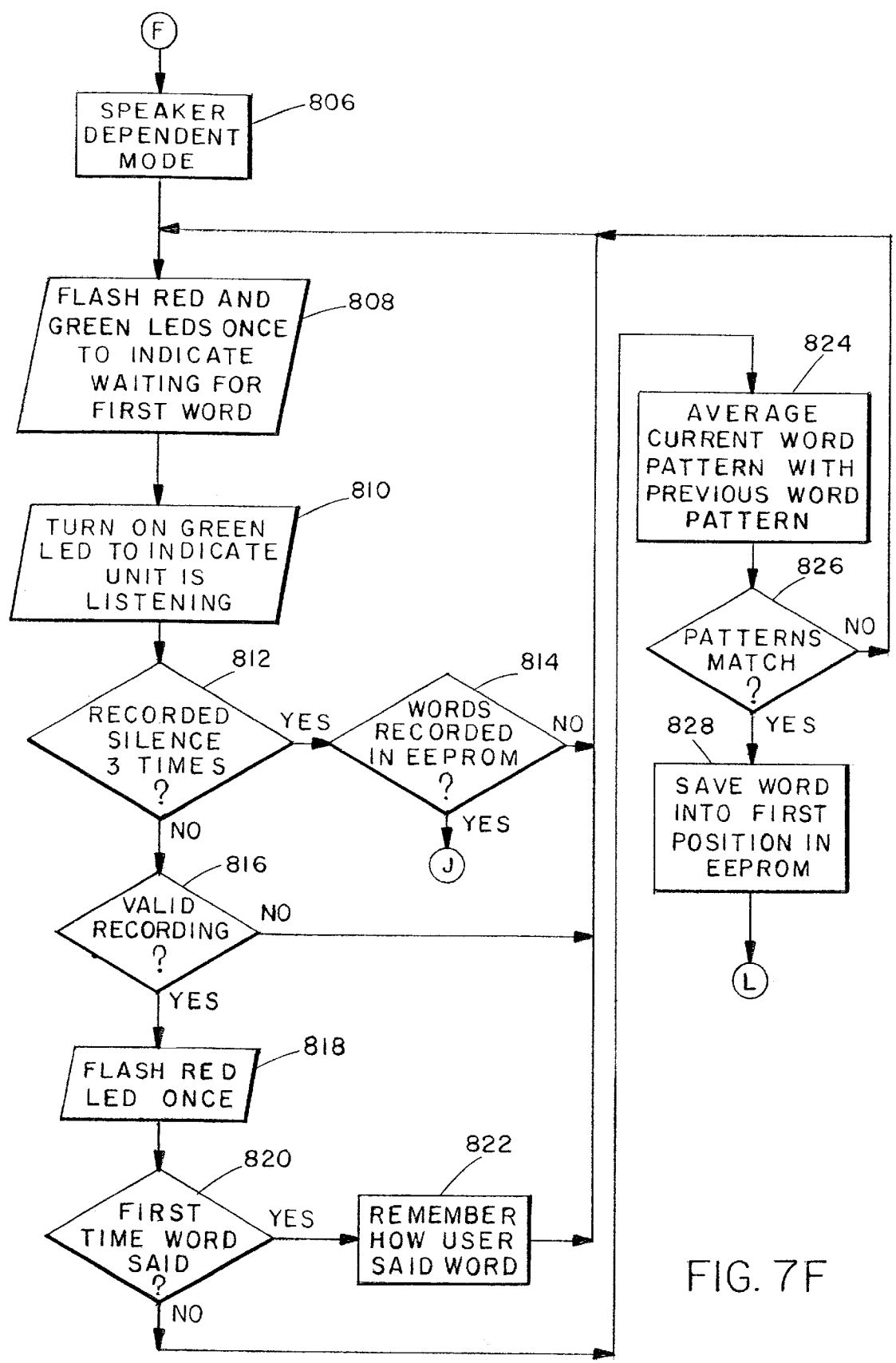
FIG. 7f is a continuation of the flowchart of FIG. 7a for a speaker dependent mode.
Figure 7G:
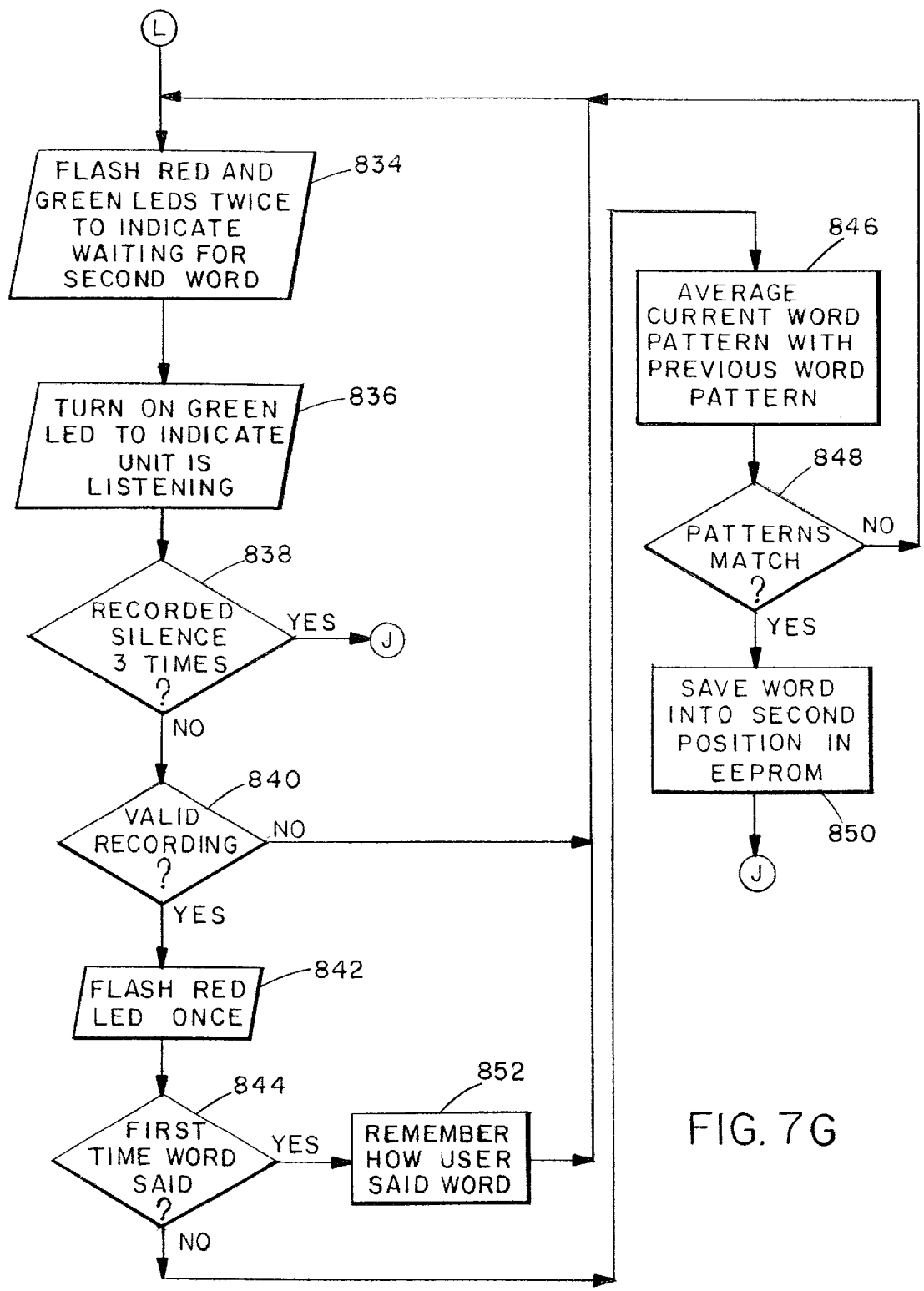
FIG. 7g is a continuation of the flowchart of FIG. 7f.
Figure 7H:
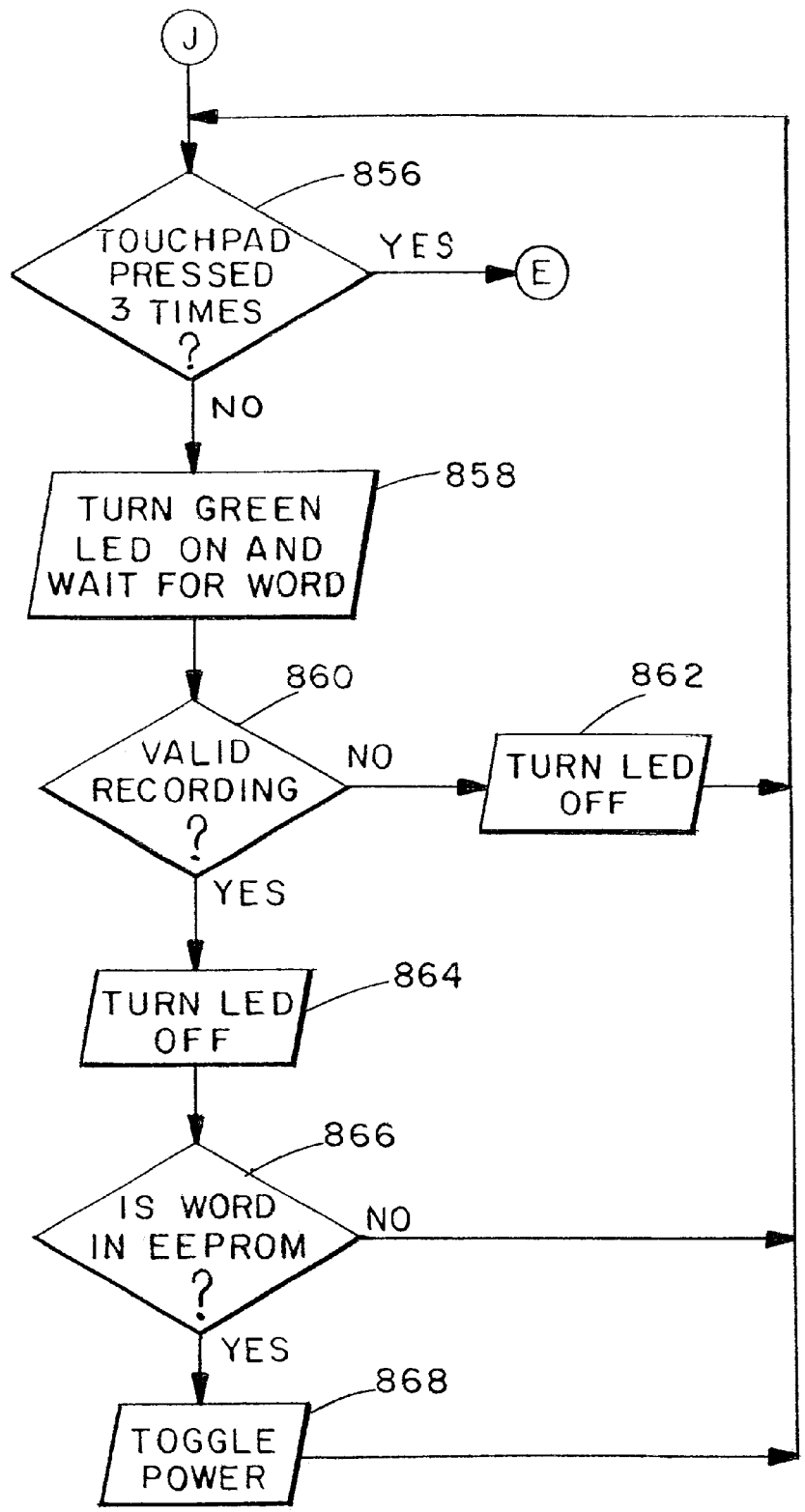
FIG. 7h is a continuation of the flowcharts of FIG. 7f and 7g.

FIGS. 7f, 7g, and 7h illustrate the flowchart for a speaker dependent mode 806. The red and green LEDs 204, 208 are flashed once to indicate that the device is waiting to record the first word 808. The green LED 208 is then illuminated to indicate that the device is listening for the first word 810. If the device has not recorded a third silence period 812, then the program determines whether an acceptable recording has occurred 816, and either branches to the start of the user dependent mode 808, or indicates a valid recording 818 by flashing the red LED 204. Upon detection of a third silence period, the program checks whether words have been recorded in memory 814. If memory contains user dependent words, the program branches to wait for a user dependent command. If the recorded word is the first recording 820, the program stores the word pattern in a temporary memory 822 and branches to 808 to prompt the user to repeat the word. If the recorded word is the second or greater recording 820, the program compares the currently recorded word with the previously recorded word 824. If the word patterns match 826, then the first word is saved in memory 828. If the word patterns do not match 826, the program branches to 808 to prompt the user to repeat the command word until the user can repeat the word in a substantially similar manner.

FIG. 7g is a continuation of the user dependent programming mode. Once a first word has been successfully recorded, the LEDs are flashed to indicate that the device is waiting for a second word 834. The green LED 208 is illuminated to indicate that the unit is ready to record the second word 836. If a silence period is recorded three times 838, then the program branches to detect a valid command word. If a valid word pattern is recorded 840, the red LED 204 flashes once 842. If the user has not repeated the word 844, the word is recorded in a temporary memory 852, and the program branches to the beginning of the sequence to record a second word 834. If the user has repeated the word at least once 844, the program compares the current word pattern with the previously recorded word pattern 846 to determine whether a match exists 848. If the patterns match 848, the user has successfully programmed the second word which is stored in a second position in memory 850.

Once a sequence of user dependent commands is successfully recorded, the device is ready to respond to user dependent commands as illustrated in the flowchart of FIG. 7h. If a reset condition is not detected 856, the device illuminates the green LED 208 to indicate that it is waiting to accept a command 858. If a speech command is successfully recorded 860, the LED is turned off 864 and the program determines whether the word is a valid user dependent word. If the word is recorded in memory 866, the power is toggled 868. Otherwise, the program loops back to 856 to await a valid user dependent command.

The flowchart of FIG. 7h illustrates a minimal example of recognizing a single user dependent word. However, the other embodiments of the program may require a sequence of words before the power is toggled 868. The other embodiments of the program may also respond according to a particular command such as "DIM" or "ON" or "OFF." Thus, the flowchart is presented for illustrative purposes and is not meant to limit the breadth of the microcontroller program.

It is evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A method for controlling a switch device in response to a sequence of speech commands from a user, said switch device having an input of standard utility AC and an AC output switch for connection to an AC circuit, said method comprising the steps of:
    (a) accepting environmental sounds and speech sounds from the user;
    (b) comparing said speech sounds with one of a set of user dependent speech sounds and user independent speech sounds to determine whether a first valid command has been uttered;
    (c) prompting the user to utter a second valid command upon determining that said first valid command has been uttered; and
    (d) producing at least one output signal upon determining that said second valid command has been uttered;
        wherein said at least one output signal controls said AC output switch.

2. The method for controlling a switching device as in claim 1, further comprising the step of:
    toggling said AC output switch utilizing a manual control means.

3. The method for controlling a switching device as in claim 2, wherein said step of toggling said AC output switch comprises the step of:
    pressing a touch pad.

4. The method for controlling a switching device as in claim 1, wherein the step of prompting the user comprises the step of:
    illuminating at least one indicator to indicate a ready state for accepting said second valid command.

5. A wall switch device for placement in a standard wall switch receptacle area, the wall switch device for switching standard utility AC to an AC circuit, said wall switch device comprising:
    a microphone circuit for accepting a plurality of sounds comprising background sounds and a plurality of speech commands;
    a filter circuit having means for filtering said plurality of speech commands from said background sounds;
    a controller circuit comprising:
        a detection means for detecting a sequence of valid speech commands from the plurality of valid speech commands, said controller circuit having a plurality of outputs comprising at least one control signal for controlling a switching means; and
        at least one indicator connected to said detection means for prompting said user to utter a next valid speech command in the sequence of valid speech commands; and
        said switching means for connecting said standard utility AC to said AC circuit upon detection of said sequence of valid speech commands.

6. The wall switch device of claim 5, further comprising a dimmer circuit having means for producing a reduced-voltage AC signal, wherein the switching means connects the reduced-voltage AC signal to the AC circuit in response to the sequence of valid speech commands.

7. The wall switch device of claim 5, further comprising:
a means for producing speech instructions; and
at least one speaker means for outputting said speech instructions for prompting the user to utter the sequence of valid speech commands.

8. The wall switch device of claim 5, wherein the sequence of valid speech commands is speaker independent.

9. The wall switch device of claim 5, wherein the controller circuit further comprises a mode means for choosing a mode of operation from a plurality of modes of operation.

10. A switching device for switching standard utility AC to an electrical device, the switching device comprising:
a switching circuit comprising:
an input circuit for detecting a plurality of speech sounds comprising a plurality of valid speech commands and a plurality of invalid speech commands;
a processor circuit having means for producing at least one AC control output signal upon recognition of a valid speech command of said plurality of valid speech commands;
at least one indicator controlled by the processor circuit for prompting the user to utter said valid speech command;
a power circuit for supplying said standard utility AC to an AC switch; and
said AC switch controlled by the AC control output signal for connecting the standard utility AC to the electrical device; and
a portable frame for holding said switching circuit.

11. The switching device as in claim 10, wherein said portable frame is a palm-sized casing, said palm-sized casing comprising:
the at least one indicator;
at least one AC receptacle for accepting a standard AC jack of the electrical device; and
an AC utility jack for plugging into an AC wall plug.

12. The switching device as in claim 10, wherein said frame is a replacement casing designed to replace an AC wall plug.

13. The switching device as in claim 10, wherein said frame is a replacement casing designed to replace an AC wall switch.

14. The switching device as in claim 10, wherein said valid speech command comprises a prompting command and an action command, said processor circuit illuminating said at least one indicator after receipt of said prompting command to prompt the user to utter said action command.

15. The switching device as in claim 10, wherein said input circuit further comprises a microphone jack for attaching an external microphone.

16. The switching device as in claim 10, wherein said switching circuit further comprising a speaker circuit for communicating speech instructions from said processor circuit.

17. The switching device as in claim 10, wherein said AC switch further comprises a dimmer circuit for reducing a voltage level of the standard utility AC.

18. A method for controlling an AC switch using speech recognition, said AC switch having an input of standard utility AC, and at least one AC receptacle for accepting at least one standard AC plug of an electrical device, said method comprising the steps of:
accepting environmental sounds and speech sounds;
converting said environmental sounds and speech sounds into a plurality of electrical signals;
comparing said plurality of electrical signals to a set of valid speech sounds;
recognizing a first valid speech sound from the set of valid speech sounds;
prompting a user to utter a second valid speech sound from the set of valid speech sounds; and
producing at least one output signal when said second speech sound matches said predetermined set of speech sounds;
wherein said at least one output signal controls a switching circuit for switching the standard utility AC to the at least one standard AC plug of the electrical device.

19. The method for controlling an AC switch as in claim 18, wherein the step of prompting the user further includes the step of:
illuminating an indicator.

20. A portable switch device for switching standard utility AC to an electrical device in response to a plurality of valid speech commands, the portable switch device having a standard AC plug for connection to a standard AC wall receptacle, and at least one standard AC receptacle for accepting a plug of the electrical device, said portable switch device comprising:
a microphone circuit for receiving a plurality of sounds comprising background sounds and the plurality of valid speech commands;
a controller circuit coupled to the microphone circuit, the controller circuit comprising:
a detection means for detecting a valid speech command of the plurality of valid speech commands, said controller circuit having a plurality of outputs comprising at least one control signal for controlling a switching means;
a mode determination means for operating said controller circuit in a mode of operation of a plurality of modes of operation in response to a mode command of the plurality of valid speech commands;
the switching means for connecting said standard utility AC to said electrical device; and
at least one indicator connected to and controlled by said controller circuit, said at least one indicator for prompting said user to utter said valid speech command.

21. The portable switch device of claim 20, further comprising a dimmer circuit having means for producing a reduced-voltage AC signal in response to one of said plurality of valid speech commands, wherein the switching means connects the reduced-voltage AC signal to the AC circuit in response to the valid speech command.

22. The portable switch device of claim 20, further comprising:
a means for producing speech instructions; and
at least one speaker means for outputting said speech instructions for prompting the user to utter a valid speech command of the plurality of valid speech commands.

23. The wall switch device of claim 20, wherein the plurality of modes of operation comprises a speaker independent mode requiring at least one pre-programmed valid command.

24. The wall switch device of claim 20, wherein the plurality of modes of operation comprises a gated mode of operation requiring a sequence of valid speech command of said plurality of valid speech commands.

* * * * *